US 6,678,622 B2

(12) United States Patent
Ellis et al.

(10) Patent No.: US 6,678,622 B2
(45) Date of Patent: Jan. 13, 2004

(54) FFT BASED DIGITAL RADIOMETER

(75) Inventors: Thomas E. Ellis, El Segundo, CA (US); Ronald W. Warren, Casanes, CA (US)

(73) Assignee: The Boeing Company, Chicago, IL (US)

(*) Notice: Subject to any disclaimer, the term of this patent is extended or adjusted under 35 U.S.C. 154(b) by 200 days.

(21) Appl. No.: 09/919,255

(22) Filed: Jul. 31, 2001

(65) Prior Publication Data

US 2003/0025486 A1 Feb. 6, 2003

(51) Int. Cl.[7] .................................................. G01V 3/00
(52) U.S. Cl. ......................................... 702/77; 324/312
(58) Field of Search ............................... 702/77, 1, 2, 8, 702/28, 66, 71, 75, 76, 78, 79, 80, 130, 134, 136; 324/300, 307, 308–310, 312, 318, 330, 332, 76.12, 76.19, 76.21, 76.24, 76.22; 340/3.1; 342/52, 62, 165, 351, 352, 195, 196, 460; 73/170.16, 170.17, 170.21, 170.28

(56) References Cited

U.S. PATENT DOCUMENTS

| | | | | |
|---|---|---|---|---|
| 4,724,439 A | * | 2/1988 | Wiley et al. | 342/351 |
| 4,988,885 A | * | 1/1991 | Lindstrom | 250/559.22 |
| 4,990,925 A | * | 2/1991 | Edelsohn et al. | 342/424 |
| 5,028,129 A | * | 7/1991 | Smith | 356/4.07 |
| 5,072,226 A | * | 12/1991 | Chang et al. | 342/351 |
| 5,281,815 A | * | 1/1994 | Even-Tov | 250/339.04 |
| 5,544,525 A | * | 8/1996 | Peterman et al. | 73/170.13 |
| 5,561,521 A | * | 10/1996 | Chase et al. | 356/451 |
| 6,049,387 A | * | 4/2000 | Griesinger | 356/419 |
| 6,377,207 B1 | * | 4/2002 | Solheim et al. | 342/351 |

* cited by examiner

Primary Examiner—Marc S. Hoff
Assistant Examiner—Edward Raymond
(74) Attorney, Agent, or Firm—Terje Gudmestad

(57) ABSTRACT

A Fast Fourier Transform based digital radiometer providing a frequency contiguous set of noise temperature measurements to characterize an atmospheric vertical temperature profile. The radiometer also has Doppler correction to account for velocity of a vehicle on which the radiometer is located and direction changes of a scene being measured.

16 Claims, 2 Drawing Sheets

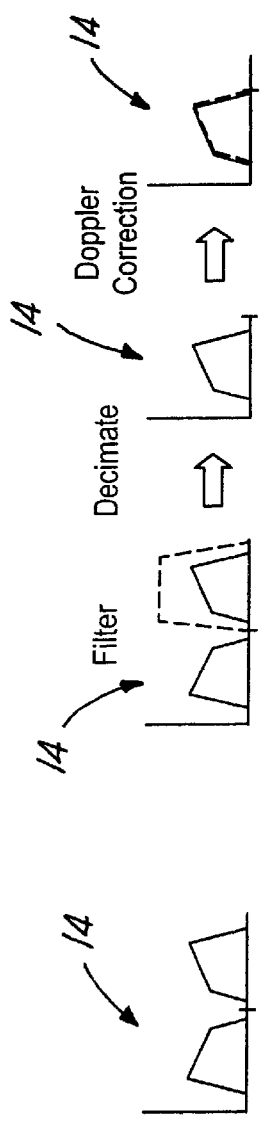
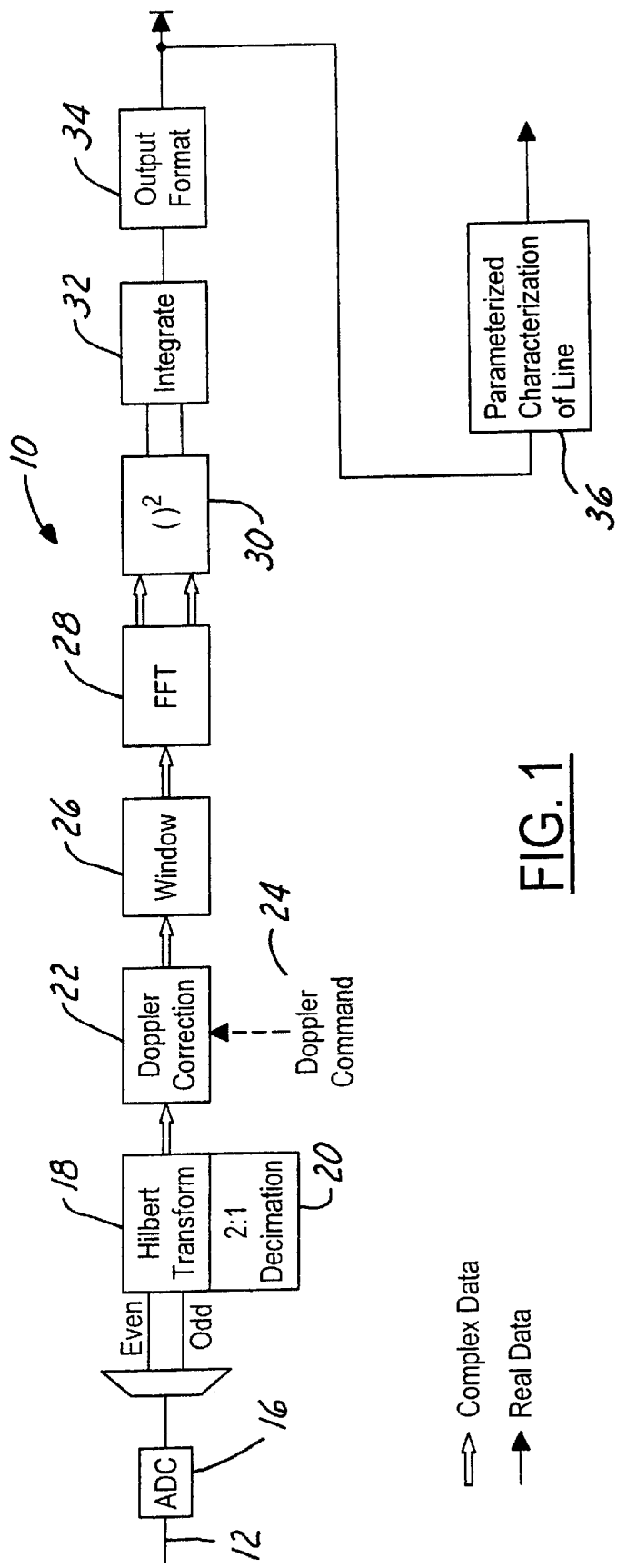

FFT BASED DIGITAL RADIOMETER

GOVERNMENT INTEREST

This invention was made with Government support under Contract No. F04701-97-C-0033. The Government has certain rights in the invention.

TECHNICAL FIELD

The present invention relates generally to radiometers and more particularly to a Fast Fourier Transform (FFT) based digital radiometer.

BACKGROUND OF THE INVENTION

A Radiometer is used on board a spacecraft to measure weather parameters from space. One function of a radiometer is to measure the temperature of the atmosphere as a function of altitude. At a specific portion of the frequency spectrum, i.e. 60 GHz, oxygen becomes very absorptive, making it ideal as a frequency to measure the temperature of the atmosphere. The radiometer measures the intensity of upwelling radiation in narrow sections, or channels, of the frequency spectrum around 60 GHz; ground based algorithms use this data to and produce a measure of the atmospheric temperature as a function of altitude.

Typically, radiometers are analog devices that have a separate filter for each narrow section of frequency. However, the filters have limitations on how close they can be spaced from each other. Due to packaging constraints on board a spacecraft, the spacing between filters is usually wider than it should be and filter spacings are typically non-uniform.

The analog approach, which has wide filter channels, tends to average out the spectral detail. The result is a lower resolution temperature profile, and ultimately a less accurate temperature measurement. Additionally, the vertical resolution of the air temperature profile is limited by achievable channel bandwidths.

The analog radiometer consists of a set of analog filters that do not provide continuous spectral coverage. The analog radiometer typically requires multiple channels and requires a separate filter for each channel. Subsequently, each filter has a separate design and each filter must be tuned. Further, Doppler correction for analog radiometers requires local oscillator tuning which causes changes in filter gain.

SUMMARY OF THE INVENTION

It is an object of the present invention to provide a Fast Fourier Transform based digital radiometer that can completely characterize an oxygen absorption line. It is another object of the present invention to provide greater spectral detail than prior art analog approaches. It is still another object of the present invention to eliminate the need for tuning individual filters.

It is a further object of the present invention to provide Doppler correction to account for the velocity of a spacecraft and the direction of the area being measured. It is yet a further object of the present invention to compensate for Doppler without affecting gain. Still a further object of the present invention to significantly reduce the output data rate of the radiometer.

According to the present invention, digital Fast Fourier Transform (FFT) techniques are applied to passive microwave sounding in the measurement of an oxygen absorption line. The present invention provides a set of noise temperature measurements that are frequency contiguous and provide a temperature profile having high vertical resolution.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 1 is a block diagram of the present invention;

FIG. 2 is a graph of the spectrum of the sampled input signal;

FIG. 3 is a graph of the frequency response of the filter stage of the present invention;

FIG. 4 is a graph of the spectrum of the signal after the filter and decimation stages of the present invention;

FIG. 5 is a graph of the spectrum of the signal at the Doppler correction stage of the present invention.

DETAILED DESCRIPTION OF PREFERRED EMBODIMENTS

Figure 6:
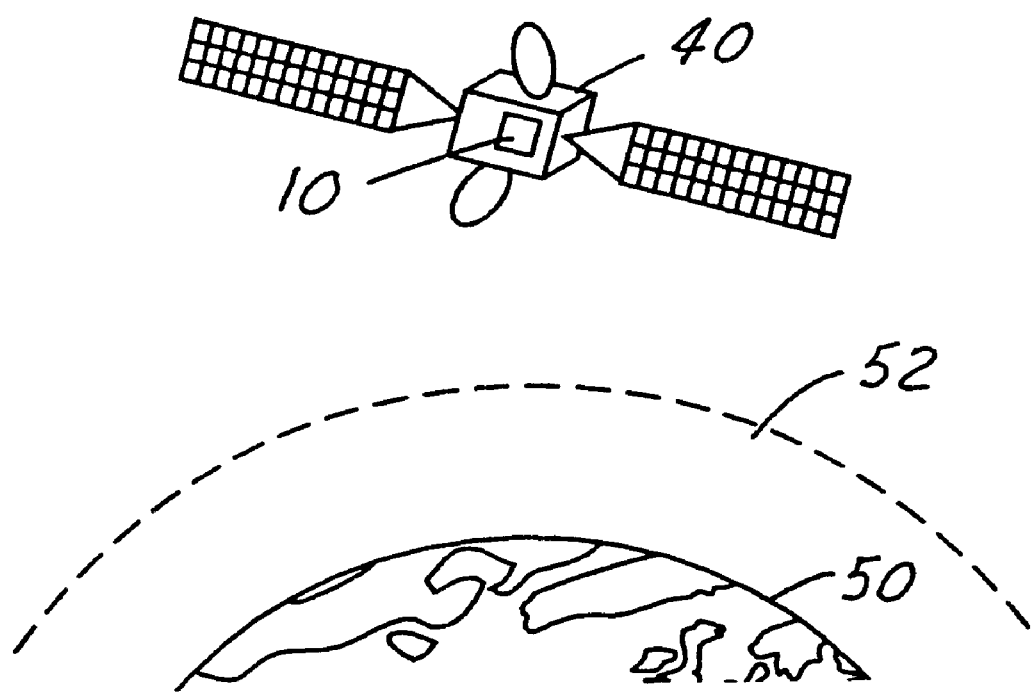
FIG. 6 is an example of a spacecraft employing the FFT based digital radiometer of the present invention.

FIG. 1 is a block diagram of the FFT digital radiometer 10 of the present invention. The radiometer of the present invention performs spectral analysis on a portion of the frequency spectrum containing an oxygen absorption line, i.e. 60 GHz. The digital radiometer according to the present invention can be embodied in a single digital chip, which replaces multiple filters and dedicated controllers associated with an analog radiometer. The advantages of the digital based radiometer are obvious in that there is a significant reduction in weight, and complexity, which translates into significant cost savings in terms of spacecraft applications.

The input 12 to the device is an analog signal that is sampled 16 as in FIG. 1, at a predetermined sampling frequency, Fs to essentially digitize the signal. Referring still to FIG. 1, the sampled signal is filtered 18, such as by a Hilbert Transform, so that the center of the passband is ¾ Fs. FIG. 3 is a graph of the signal 14 at the filter stage of the present invention. The significance of ¾ comes from standard techniques for digital processing that will optimize the output of the radiometer of the present invention. It should be noted that if the desired signal is centered at ¼ Fs, the center of the filter passband would be moved to ¼ Fs without departing from the scope of the present invention.

Referring back to FIG. 1, the signal is decimated 20 by a factor of 2 producing a sampling frequency of Fs/2(Fs2) or $F_d$. FIG. 4 is a graph of the spectrum of the signal 14 after filtering and decimation. Decimation is performed in digital processing as a way to keep the amount of data limited in order to optimize processing.

Again referring to FIG. 1, Doppler correction 22 is performed by multiplying the signal samples by $e^{j*2*\pi*(f/Fd)*n}$, where f is the frequency shift corresponding to the Doppler being corrected for, n is the sample index, j is the square root of −1, and $F_d$ is the decimated sampling frequency. A Doppler command 24 is applied and is based on the speed of the spacecraft. FIG. 5 is a graph of the spectrum of the signal 14 after Doppler correction. Doppler correction according to the present invention is accomplished without affecting the gain. Prior art approaches to Doppler correction for an analog radiometer require tuning a local oscillator during a scan, which also introduced a change in gain during a scan that could not be calibrated out. Thereby adversely affecting the output.

A window 26 is applied in the time domain to control the filter main lobe width and sidelobe structure, also known as channel-to-channel interference. Because the spacecraft is moving, the sampling by the radiometer must be limited to a specific area, bandwidth, and moment in time. Applying the window provides the radiometer with a "snapshot" of an area being measured for a predetermined amount of time.

According to the present invention, a digital Fast Fourier Transform, or FFT 28 is applied. The digital FFT 28 has a predetermined overlap for sampling the digitized signal. According to one embodiment of the present invention, the predetermined overlap is 50%. For example, assume the FFT takes 256 consecutive samples of the digitized signal. The next FFT then takes 256 samples, 128 of which overlap the previous FFT, and 128 of which are new samples. While a 50% overlap has been deemed as an optimal overlap for providing a smooth data output, it should be noted that the overlap may be smaller or larger without departing from the scope of the present invention. The size of the FFT and the sampling rate, t, determine the spectral resolution and the bandwidth covered by the radiometer output.

According to standard digital processing techniques, the magnitude squared of the FFT output is computed 30, and that data is integrated 32 to provide a smoothed estimate of the noise power for each sampling also called a bin. Each bin in an FFT output is summed with the same bin from subsequent FFT outputs as the sampling is repeated. The effect is time integration of the FFT output.

The data is then formatted 34 for output. There are many alternatives to how the data is formatted and each will depend on the specific requirements and needs of the application of the radiometer. For example, because the FFT provides a continuum of narrowband filter channels covering the oxygen line the spectral content of the line can be characterized parametrically 36 such as a least squares polynomial curve fit.

FIG. 6 is an example of an application of the digital FFT based radiometer 10 of the present invention. The radiometer 10 is located on board a satellite 40 that orbits the earth 50 and takes measurements of the earth's atmosphere 52 at a predefined altitude.

The invention covers all alternatives, modifications, and equivalents, as may be included within the spirit and scope of the appended claims.

What is claimed is:

1. A method for performing spectral analysis on a portion of a spectrum containing an oxygen absorption line, said method comprising the steps of:

sampling an analog signal at a sampling frequency of Fs to collect sampled data;
   filtering said sampled data;
   decimating said data by a predetermined factor;
   compensating for Doppler effects;
   applying a window in the time domain;
   applying a Fast Fourier Transform having a predetermined overlap resulting in FFT output;
   computing the magnitude squared of the FFT output;
   integrating the magnitude squared of the FFT output;
   summing the integrated FFT outputs for a predetermined bin;
   formatting said summed outputs for output.

2. The method as claimed in claim 1 further comprising the step of parametrically characterizing the FFT output.

3. The method as claimed in claim 2 wherein said step of parametrically characterizing the FFT output further comprises computing a least squares polynomial curve fit.

4. The method as claimed in claim 1 wherein said step of filtering further comprises a Hilbert Transform.

5. The method as claimed in claim 1 wherein said step of compensating for Doppler effects further comprises the steps of:

multiplying the decimated data by $e^{j*2*\pi*(f/Fd)*n}$, where f is a frequency shift corresponding to Doppler being corrected for, Fd is a decimated sampling frequency, n is a sample index, and j is the square root of −1.

6. The method as claimed in claim 1 wherein said step of applying a Fast Fourier Transform further comprises applying a Fast Fourier Transform having an overlap of 50%.

7. A method for performing spectral analysis on a portion of a spectrum containing an oxygen absorption line, said method comprising the steps of:

sampling an analog signal at a sampling frequency of Fs to collect sampled data;
   filtering said sampled data using a Hilbert Transform;
   decimating said data by a factor of two;
   compensating for Doppler effects by multiplying said data by $e^{j*2*\pi*(f/Fd)*n}$;
   applying a window in the time domain;
   applying a Fast Fourier Transform having an overlap of 50% resulting in FFT output;
   computing the magnitude squared of the FFT output;
   integrating the magnitude squared of the FFT output;
   summing the integrated FFT outputs for a predetermined bin;
   formatting said summed outputs for output.

8. The method as claimed in claim 7 wherein said step of formatting said summed outputs further comprises the step of parametrically characterizing the FFT output.

9. The method as claimed in claim 7 wherein said step of parametrically characterizing the FFT output further comprises computing a least squares polynomial curve fit.

10. A digital radiometer comprising:

a signal sampling unit having a sampling frequency of Fs Hertz to collect data;
    a signal processor for applying a Fast Fourier Transform to a sampled signal whereby said digital radiometer produces a spectral analysis on a portion of the spectrum containing an oxygen absorption line;
    a downconverter for placing the center of the band at ¾ Fs; and a decimator for decimating the sampling frequency by a factor of 2.

11. The digital radiometer as claimed in claim 10 wherein said downconverter further comprises a filter.

12. The digital radiometer as claimed in claim 11 wherein said filter is a Hilbert Transform.

13. The digital radiometer as claimed in claim 10 wherein said signal processor further comprises Doppler compensation.

14. The digital radiometer as claimed in claim 13 wherein said Doppler compensation further comprises multiplying the data by $e^{j*2*\pi*(f/Fd)*n}$, where f is a frequency shift corresponding to the Doppler being corrected for, Fd is a decimated sampling frequency and n is a sample index.

15. The digital radiometer as claimed in claim 13 further comprising a Fast Fourier Transform (FFT) having a predetermined overlap.

16. The digital radiometer as claimed in claim 15 wherein said overlap is 50%.

* * * * *